Jan. 1, 1952  D. F. PRZYBYLSKI  2,580,955
SPEED REDUCTION UNIT

Filed May 1, 1950  7 Sheets-Sheet 1

INVENTOR.
DANIEL F. PRZYBYLSKI
BY
*Harry D. Kilgore*
ATTORNEY

Jan. 1, 1952  D. F. PRZYBYLSKI  2,580,955
SPEED REDUCTION UNIT
Filed May 1, 1950  7 Sheets-Sheet 2

INVENTOR.
DANIEL F. PRZYBYLSKI
BY
Harry D. Kilgore
ATTORNEY

Jan. 1, 1952  D. F. PRZYBYLSKI  2,580,955
SPEED REDUCTION UNIT

Filed May 1, 1950  7 Sheets-Sheet 3

INVENTOR.
DANIEL F. PRZYBYLSKI
BY Harry D. Kilgore
ATTORNEY

Jan. 1, 1952 D. F. PRZYBYLSKI 2,580,955
SPEED REDUCTION UNIT
Filed May 1, 1950 7 Sheets-Sheet 4

INVENTOR.
DANIEL F. PRZYBYLSKI
BY
ATTORNEY

Jan. 1, 1952     D. F. PRZYBYLSKI     2,580,955
SPEED REDUCTION UNIT

Filed May 1, 1950     7 Sheets-Sheet 6

*INVENTOR.*
DANIEL F. PRZYBYLSKI
BY

ATTORNEY

Jan. 1, 1952   D. F. PRZYBYLSKI   2,580,955
SPEED REDUCTION UNIT
Filed May 1, 1950   7 Sheets-Sheet 7

INVENTOR.
DANIEL F. PRZYBYLSKI
BY
ATTORNEY

Patented Jan. 1, 1952

2,580,955

UNITED STATES PATENT OFFICE 2,580,955

SPEED REDUCTION UNIT

Daniel F. Przybylski, Winona, Minn.

Application May 1, 1950, Serial No. 159,263

15 Claims. (Cl. 74—750)

My present invention relates to improvements in speed or gear reduction units.

This invention is intended for general use and is especially well adapted for embodiment in a conventional tractor.

It is well known that certain tractor-operated or drawn implements or machines, for instance, a trencher, must be operated at a greatly reduced speed from that delivered by a conventional tractor.

The principal object of this invention is to make use of a conventional tractor by embodying therein a speed reduction unit having selective manually-operated means, by the use of which novel gearing from the rear axle to one of the traction wheels, it is possible to turn the wheel at a very slow speed.

A further object of this invention is to use this manually-operated means for connecting the wheel directly to the axle, whereby said wheel will be turned at the same speed as the axle, when the tractor is travelling to and from work or on the highway.

Other objects of the invention will be apparent from the following description, reference being had to the drawings.

To the above end, the invention consists of the novel devices and combination of devices hereinafter described and defined in the claims.

In the accompanying drawings, which illustrate the invention, like characters indicate like parts throughout the several views.

Referring to the drawings.

Figure 2:
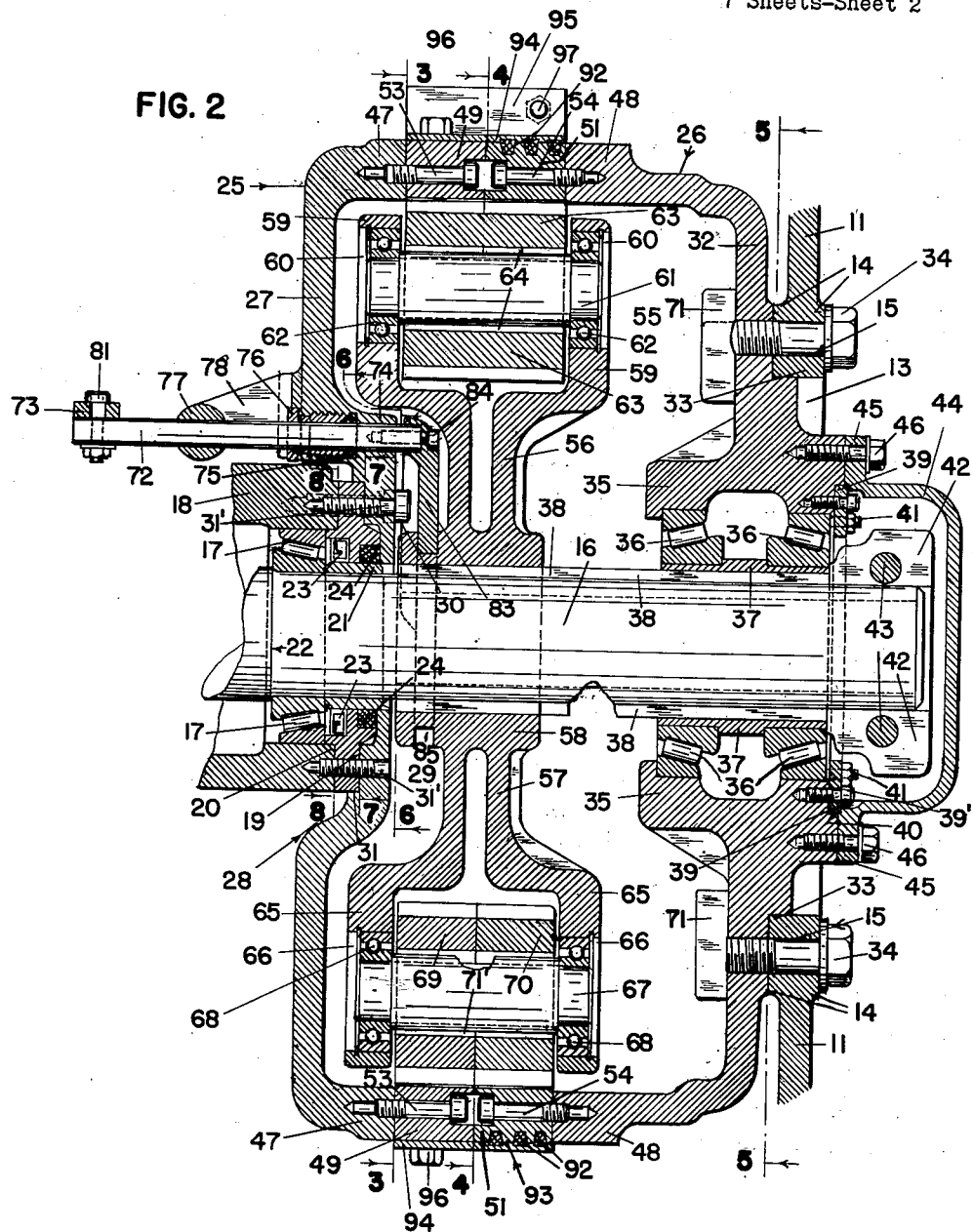
Fig. 2 is a sectional view taken on the line 2—2 of Fig. 1, on an enlarged scale, only a fragment of the wheel being shown.
Figure 3:
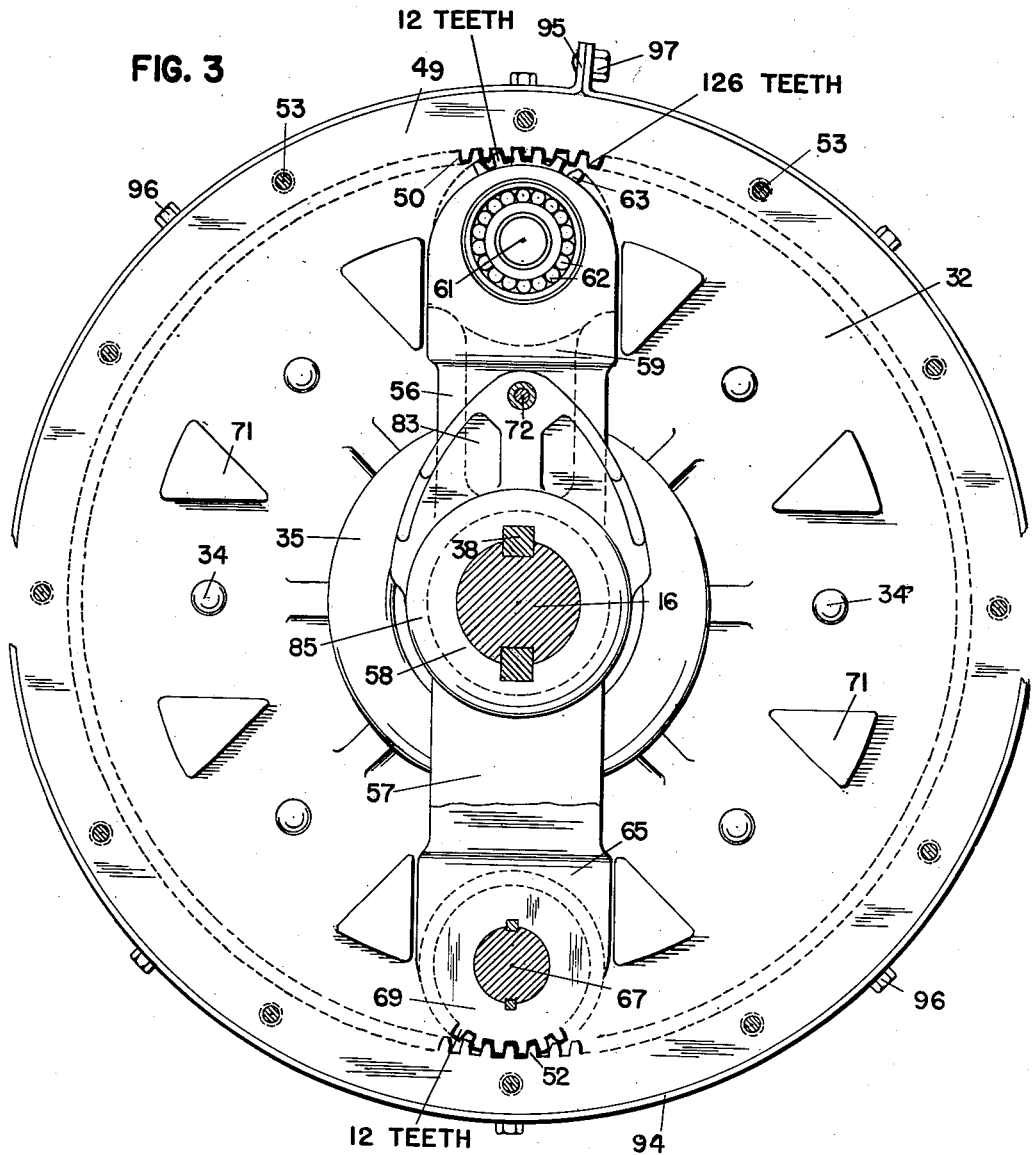
Figure 4:
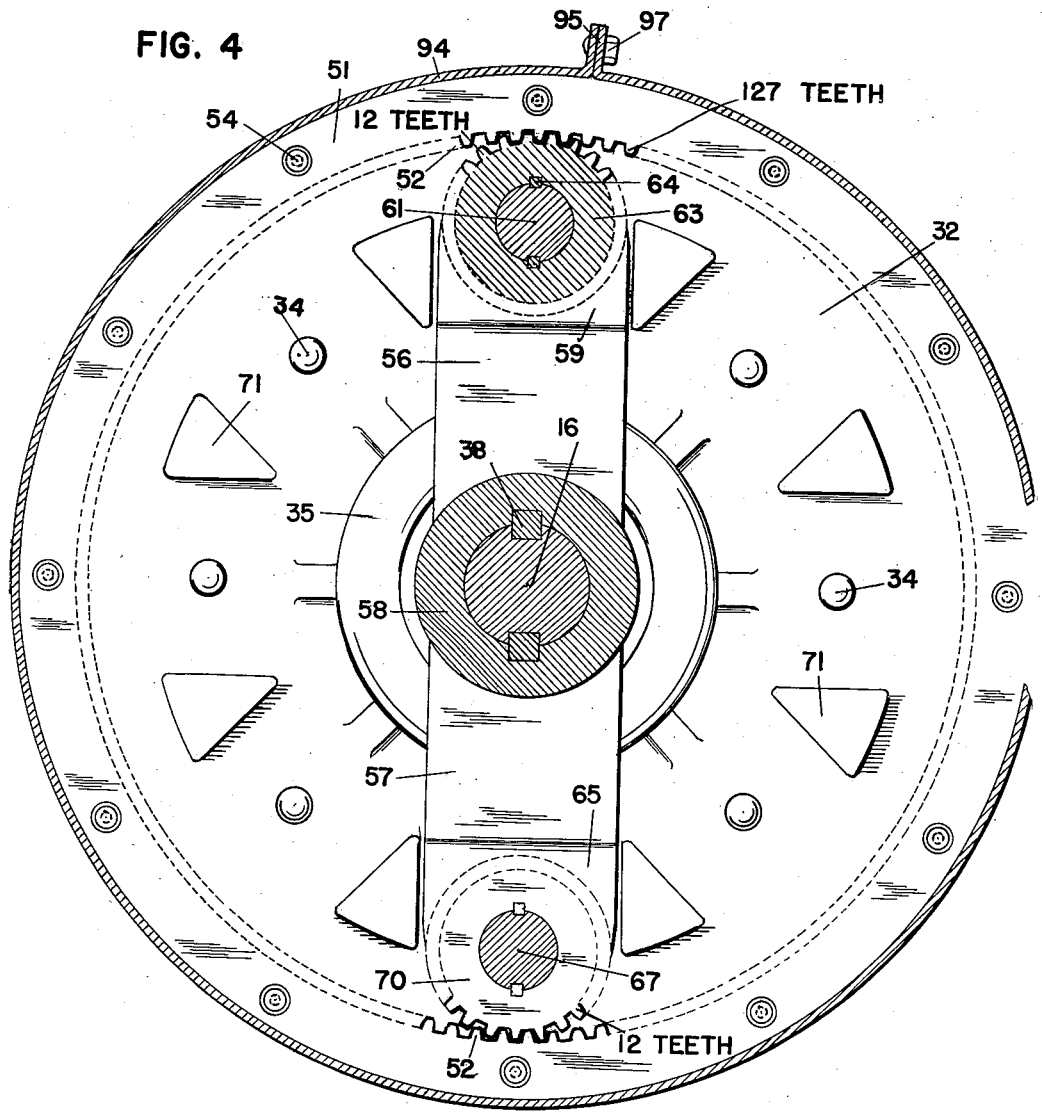
Figure 5:
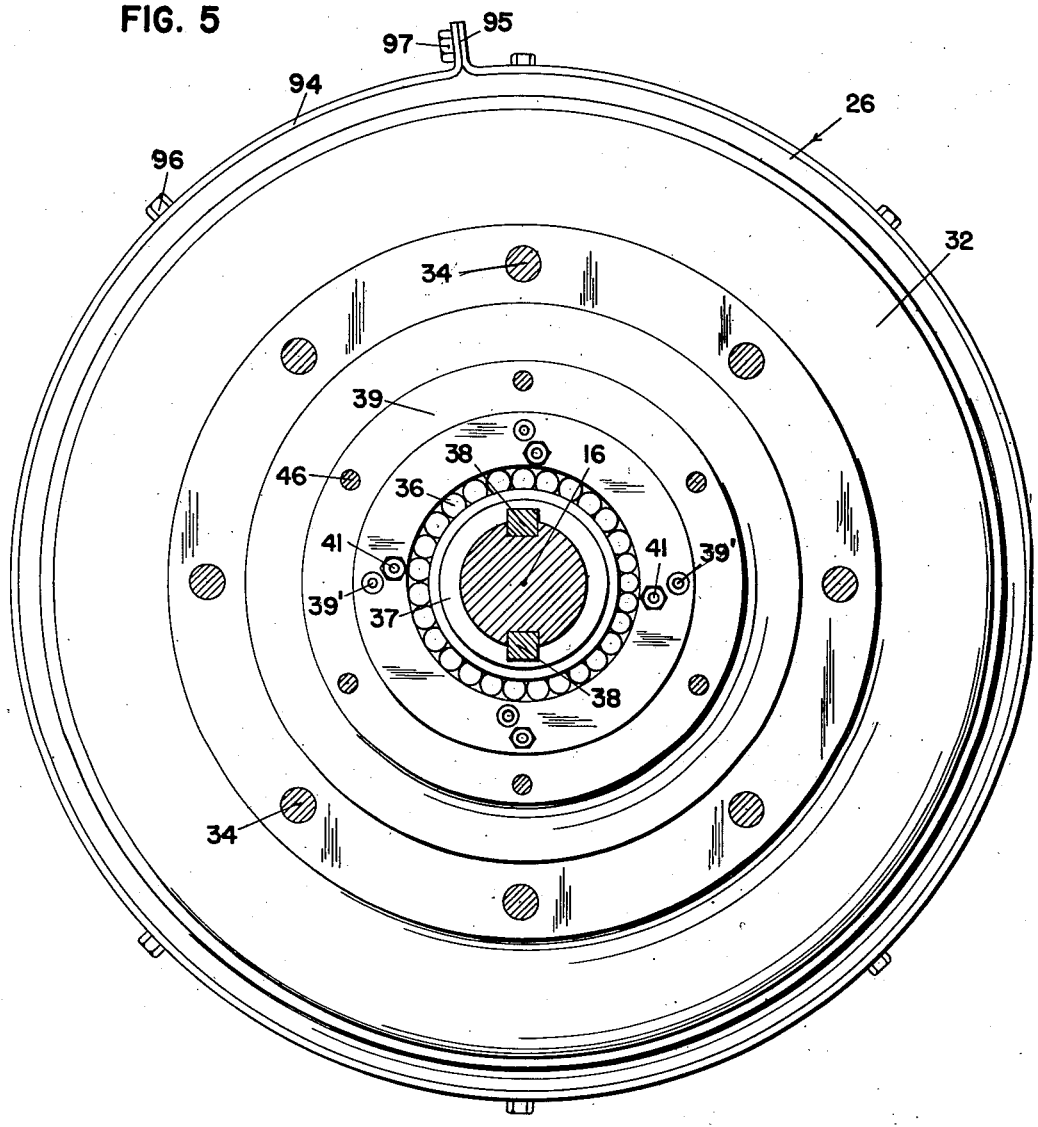
Figure 6:
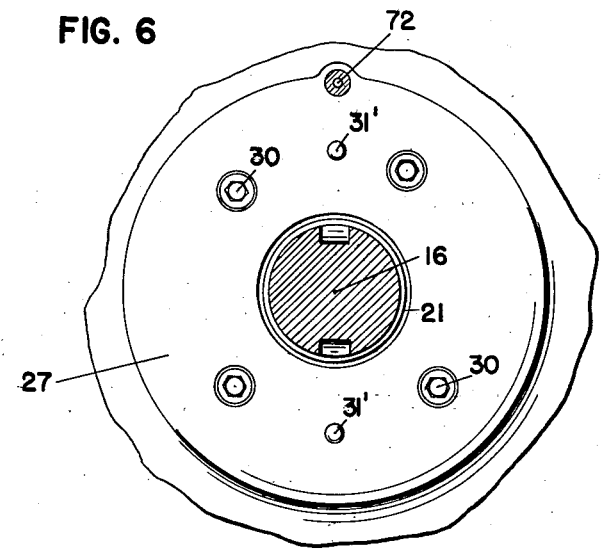
Figure 7:
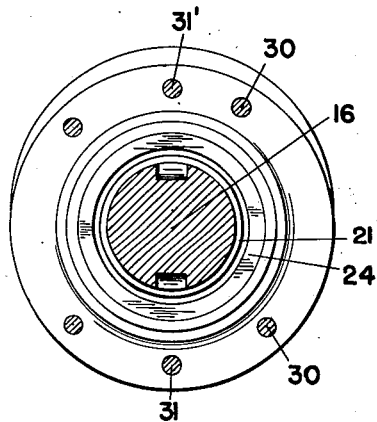
Figure 8:
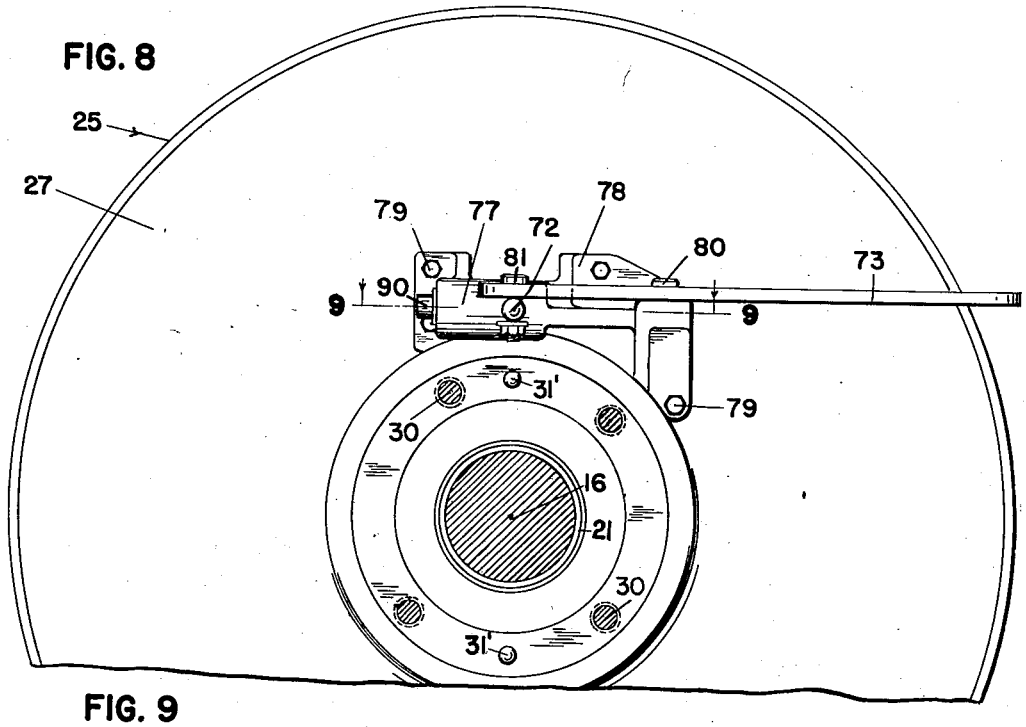
Figure 9:
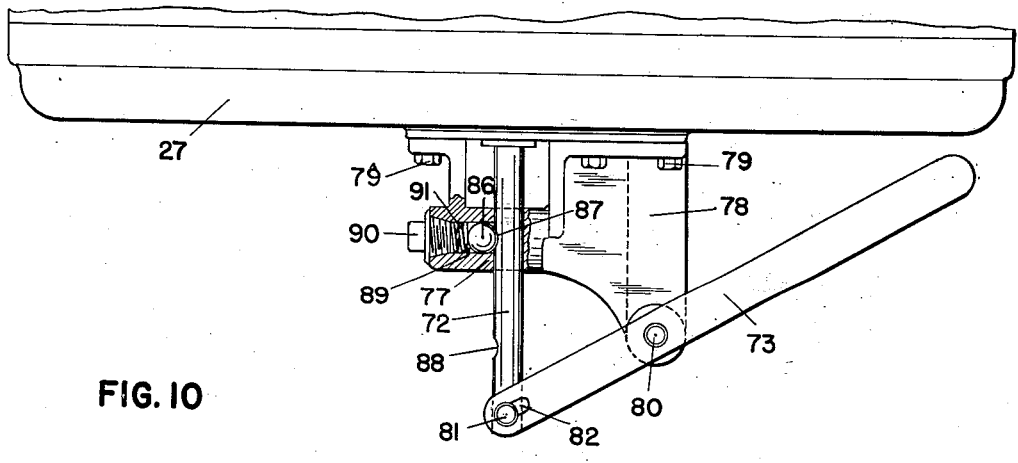
Figure 10:
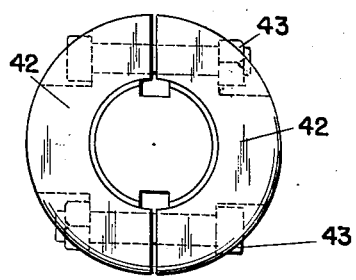

Figs. 3 and 4 are views principally in section taken on the lines 3—3 and 4—4 of Fig. 2, respectively;

Fig. 5 is a view partly in end elevation and partly in section taken on the line 5—5 of Fig. 2;

Fig. 6 is a fragmentary detail view partly in end elevation and partly in section taken on the line 6—6 of Fig. 2;

Fig. 7 is a detail partly in end elevation and partly in section taken on the line 7—7 of Fig. 2;

Fig. 8 is a fragmentary view partly in end elevation and partly in section taken on the line 8—8 of Fig. 2;

Fig. 9 is a fragmentary view partly in plan and partly in section taken on the line 9—9 of Fig. 8; and Fig. 10 is an end view of the axle and applied collar.

Figure 1:
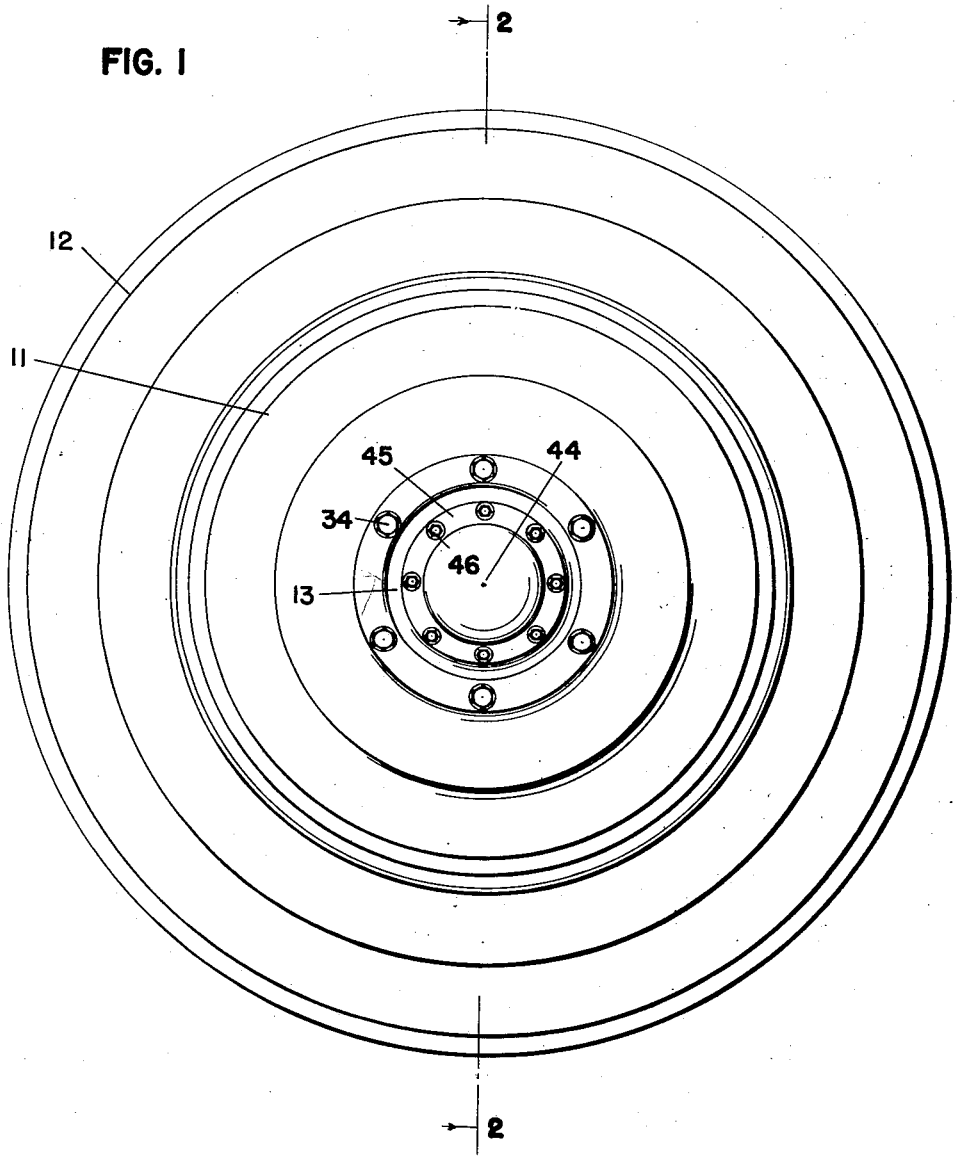
Fig. 1 is an outside elevational view of a tractor wheel and the speed-reduction unit exposed through a central aperture in the wheel.

One of the traction wheels 11 of a standard tractor, shown in Fig. 1, is equipped with a pneumatic tire 12 and has a large annular aperture 13 at the axis thereof. The body of the wheel 11, surrounding the aperture 13, is increased in thickness both internally and externally, as indicated at 14, and formed therein is a plurality of circumferentially spaced holes 15 for machine screws. One end portion of the tractor axle 16 is mounted in a roller bearing 17 in an axle housing 18, fragmentarily shown. The outer end portion of the axle 16 projects outwardly through the aperture 13 in axial alignment with the wheel 11.

The outer end of the axle housing 18 is closed by a cap 19 having an axial opening through which the axle 16 projects. The inner side of the cap 19 is rabbeted at 20 to fit in the axle housing 18 and bears against the outer end of said housing. This cap 19 is mounted on a sleeve bearing 21 on the axle 16 and has beveled ends. The member of the roller bearing 17 on the axle 16 is held against relative axial movement between said bearing member and a shoulder 22 on the axle 16. The cap 19 is internally rabbeted at the axial hole therein to hold an oil seal 23 and externally rabbeted at said hole to hold a packing 24. Both the oil seal 23 and the packing 24 are in contact with the sleeve bearing 21.

The parts thus far described are common to standard tractors.

The speed or gear reduction unit includes an inner fixed gear support 25 and an outer driven gear support 26. Both gear supports 25—26 are annular and each has an annular aperture at its axis through which the axle 16 projects. These two gear supports 25—26 are axially aligned with the axis of the axle 16.

The fixed gear support 25 includes a flat end member 27, the central portion 28 of which is inset to form an external cavity into which the cap 19 and the outer end portion of the axle housing 18 extends. Opposing sides of the cap 19 and the inset central portion 28 of the fixed gear support 25 are rabbeted at 29 for interlocking engagement by axial movement of said gear support relative to the cap 19. Screws 30 extend through aligned holes in the fixed gear support 25 and the cap 19 and have threaded engagement with the axle housing 18. These screws 30 rigidly secure the fixed gear support 25 to the axle housing 18 with the cap 19 clamped therebetween. In addition to the screws 30, the cap 19 is further detachably secured to the axle housing 18 by a pair of diametrically opposite pins 30' anchored to said housing and extending through holes in the cap 19 and the gear support 25. The purpose of the pins 30' is to align the members 18—19—25 and to take the torque from the machine screws 30.

The inset portion 28 of the fixed gear support 25 is further externally rabbeted at the aperture therein, as indicated at 31, to telescopically receive the opposing portion of the cap 19. The inset portion 28 of the fixed gear support 25 affords a closure for the rabbet containing the packing 24.

The driven gear support 26 includes an end member 32 having an external rabbet 33 in which is mounted the thickened portion 14 of the wheel 11. Machine screws 34 extend through the holes 15 in thickened portion 14 of the wheel 11, have threaded engagement with the end member 32 and rigidly secure the driven gear support 26 to the wheel 11.

The end member 32, at the aperture 13 in the driven gear member 26, is expanded both internally and externally to afford a hub 35. This hub 35 is journaled on the axle 16 by means of a pair of axially spaced roller bearings 36. The internal annular members of the roller bearings 36 are fitted on the end portions of a long sleeve 37 that are of a reduced diameter. This sleeve 37 is telescoped onto the axle 16 and secured for rotation therewith by a pair of diametrically opposite keys 38.

A flat retaining ring 39 is fitted in a rabbet 40 in the outer end of the hub 35 and secured by screws 39' to said hub. This retaining ring 39 overlaps the external member of the outer roller bearing 36. A plurality of nut-equipped screw studs 41 extend transversely through the retaining ring 39 with which they have threaded engagement, impinge the external member of the roller bearing 36 and hold the same against outward axial movement relative to the axle 16.

A two-part collar 42 on the outer end portion of the axle 16 and the housing 18 hold the speed reduction unit against axial movement on the axle 16. The members of the collar 42 are connected by a pair of diametrically opposite bolts 43 that frictionally clamp the collar 42 to the axle 16.

A cap 44 normally closes the aperture 13 in the wheel 11 outwardly of the axle 16 and the collar 42. This cap 44 has an annular outturned flange 45 that bears on the outer end of the hub 35 outwardly of the retaining ring 39. This cap 44 is detachably secured to the hub 35 by means of a plurality of circumferentially spaced machine screws 46 that extend through holes in the flange 45 and have threaded engagement with the hub 35.

The fixed gear support 25 has, integral with its perimeter, an inturned annular body member 47, and an inturned annular body member 48 is integral with the perimeter of the driven gear support 26. These body members 47 and 48, at their outer end portions, are identical the one with the other and are of the same diameter. The body member 48 is considerably wider than the body member 47.

The two body members 47 and 48 are axially spaced apart and interposed therebetween is a stationary ring gear 49 having internal teeth 50 and a driven ring gear 51 having internal teeth 52. The internal and external body diameters of the ring gear 49—51 and the body members 47 and 48 are the same and the gear teeth 50—52 project inwardly of said body members.

The ring gear 49 has 126 teeth, as indicated on Fig. 3, and the ring gear 51 has 127 teeth, as indicated on Fig. 4. In other words, the driven gear 51 has one more tooth than the fixed gear 49 and the teeth 52 are thinner than the teeth 50.

The fixed ring gear 49 is secured to the body member 47 of the stationary gear support 25 by a plurality of circumferentially spaced screws 53 that extend through transverse holes in the ring gear 49 and have threaded engagement with the body member 47 of the stationary gear support 25. The driven ring gear 51 is secured to the body member 48 of the driven gear support 26 by a plurality of circumferentially spaced screws 54. These screws 54 extend through transverse holes in the driven ring gear 51 and have threaded engagement with the body member 48 of the driven gear support 26.

Obviously, the gear supports 25—26 and the ring gears 49—51 form a complete housing 55 between the axle housing 18 and the wheel 11.

Within the housing 55 is a pair of diametrically opposite radial arms 56 and 57 integral with a common hub 58 on the axle 16. The hub 58 is held on the axle 16 for rotation therewith by the keys 38, but is free to slide axially on said axle, for a purpose that will presently appear. The arm 56 is bifurcated to provide a pair of prongs 59 having therein axially aligned eyes 60. A short shaft 61 having reduced end portions is mounted in the eyes 60 by means of ball bearings 62. A single pinion 63 is secured on the shaft 61 for rotation therewith by means of a pair of diametrically opposite keys 64. As shown in Fig. 2, the pinion 63 meshes with the two ring gears 49—51.

The arm 57 is also bifurcated at its outer end portion to provide a pair of prongs 65 having therein a pair of axially aligned eyes 66. A short shaft 67 having reduced end portions is mounted in the eyes 66 by means of ball bearings 68. A single pinion 69 on the shaft 67 meshes with the fixed ring gear 49 and a retarded pinion 70 on the shaft 67 meshes with the driven ring gear 51, as shown in Fig. 2. In this adjustment of the unit, the wheel is driven from the axle 16 through the gearing above described.

The pinion 69 is secured to the shaft 67 by a pair of diametrically opposite keys 71' while the retarded pinion 70 is free to turn relative to the shaft 67 and hence the pinion 69.

Four pairs of driving lugs 71 integral with the end members 36 of the driven gear support 26 on the inner side thereof are circumferentially spaced ninety degrees (90°) apart. The lugs 71 of each pair are circumferentially spaced apart to receive one of the arms 56—57 therebetween with a working clearance. By sliding the hub 58 axially on the axle 16, toward the wheel 11, the arms 56—57 carried thereby will be projected between the lugs 71 of one of the diametrically opposite pairs. Obviously, the arms 56—57 and the lugs 71 afford clutch means that directly connect the wheel 11 to the axle 16 to be turned thereby at the same speed while the tractor is travelling on a highway or to and from work in a field.

At the time the arms 56—57 are being moved for interlocking engagement with certain of the lugs 71, and just before they enter between said lugs, the arm 56 draws the pinion 63 out of mesh with stationary gear 49, while remaining in mesh with the driven gear 51. At this same time, the arm 57 draws the pinion 69 out of mesh with the stationary gear 49 and into mesh with the driven gear 51 and pinion 70 out of mesh with the driven gear 51.

Axial movement of the arms 56—57 away from the wheel 11 will first disengage the arms 56—57 with the respective lugs 70 and thereafter the arm 56 will slide the pinion 63 into mesh with the stationary gear 49 while remaining in mesh with the driven gear 51. During this axial movement of the arms 56—57, the arm 57 will slide the pinion 69 out of mesh with the driven gear 51 and into mesh with the stationary gear 49 and will also slide the pinion 70 into mesh with the driven gear 51. The object of providing diametrically opposite pinions that mesh with the gears 49—51 is to equalize the torque on the axle 16.

The pinions 63, 69 and 70 each have twelve (12) teeth, as indicated on the sheet containing Fig. 2. On this same sheet, it is noted that the stationary gear 49 has one hundred and twenty-six teeth, while the driven gear 51 has one hundred and twenty-seven teeth. This difference in the number of teeth on the gears 49—51 will advance the driven gear 51 relative to the stationary gear 49 for each rotation of the axle 16 and the arms 56—57 the distance equal to the distance from the center of one tooth to the center of the next tooth. The additional tooth on the gear 51 will advance the wheel in proportion to the diameter of the gears 49—51 and the diameter of the tire 12. In other words, two radial lines extending from the axis of the axle 16 and passing through the centers of two adjacent teeth of the driven gear 51 will indicate the step of rotary movement of the wheel 11 where the two radial lines intersect the tread of the tire 12. It will thus be seen that when the wheel 11 is turned by the gearing from the axle 16, that the tractor will be moved at a very slow speed relative to that of the axle 16, which is essential when the tractor is drawing an implement or a machine, for instance, a trencher, that must be moved very slowly while performing its work.

As one means of sliding the hub 58 on the axle 16, I provide an endwise movable rod 72 that is parallel to and above the axle 16, and is operated by a shipper lever 73 at the rear of the unit. The rod 72 extends through a bore 74 in the end member 27 of the stationary gear support 25, a packing 75 in the enlarged outer end portion of the bore 74 and a packing nut 76 having internal screw-threaded engagement with said end member. The rod 72 is further held and guided for straight-line endwise sliding movement by an intermediate bearing 77 and a bracket 78 secured by machine screws 79 to the end member 27 of the stationary gear support 25. The shipper lever 73 is intermediately pivoted at 80 to the bracket 78 and is pivotally attached at its inner end portion to the outer end portion of the rod 72 by a nut-equipped bolt 81. This bolt 81 extends through a bore in the rod 72 and a short longitudinally extended slot 82 in the lever 73.

A shipper yoke 83 is removably mounted on the inner end of the rod 72 and held thereon by a screw 84. This shipper yoke 83 extends into an annular channel 85 in the rear end portion of the hub 58 and straddles said hub. The hub 58 is yieldingly held in its two extreme positions on the axle 16 by a friction ball 86 that extends into an inner notch 87, as shown on the drawings. When the shipper yoke 83 is operated to move the hub 58 toward the wheel 11 to interlock the arms 56—57 with one of the diametrically opposite pairs of driving lugs 71, the ball 86 enters an outer notch 88 in the rod 72 and positions the hub 58 with arms 56—57 interlocked with one of the diametrically opposite pairs of lugs 71. The ball 86 is mounted in a deep external cavity 89 in the bearing 77, the axis of which is perpendicular to the axis of the rod 72. This cavity 89 at its outer end is normally closed by a tapered screw plug 90. A coiled spring 91 is compressed between the ball 81 and the screw plug 90 and yieldingly holds said ball against the rod 72.

Three oil rings 92 of felt or other absorbent material are mounted in transversely spaced annular channels 93 in the periphery of the driven gear 51. A divided annular band 94 encircles the two gears 49 and 50, affords a covering for the joint between the gears 49—50 and the oil rings, and the end portions thereof are turned outwardly to afford a pair of ears 95. The band 94 is detachably secured to the stationary gear 49 by a plurality of machine screws 96 and the ears 95, in the plane of the driving gear 51 are connected by a screw 97.

The word "axle" is herein used in a broad sense to cover a shaft.

The drawings illustrate a commercial form of the invention, but it will be understood that the same is capable of certain modifications as to details of construction, arrangement and combination of parts within the scope of the invention herein disclosed.

What I claim is:

1. In a unit of the class described, a driven axle, a wheel, clutch means fixed relative to the wheel for driving the same, a fixed gear, a driven gear journaled on the axle and secured to the wheel for turning the same, said wheel and gears being in axial alignment with the axle, a radial arm on the axle held for rotation therewith but free for axial sliding movement thereon, means for sliding the arm on the axle into interlocking engagement with the clutch means to turn the wheel directly from the driven axle at the same speed, a pinion journaled on the arm and meshing with the driven gear, said arm-sliding means being operable to slide the arm on the axle to disengage the arm from the clutch means and move the pinion into mesh with the fixed gear while remaining in mesh with the driven gear for indirectly turning the wheel from the driven axle, the teeth of the gears and the pinion being constructed and arranged to turn the wheel at a materially slower speed than that of the driven axle.

2. In a unit of the class described, a driven axle, a wheel, clutch means fixed relative to the wheel for driving the same, a fixed gear, a driven gear journaled on the axle and secured to the wheel for turning the same, said wheel and gears being in axial alignment with the axle, a pair of aligned diametrically opposite radial arms having a common hub held on the axle for rotation therewith but free for axial sliding movement thereon, means for sliding the hub on the axle to move at least one of the arms into interlocking engagement with the clutch means to turn the wheel directly from the driven axle at the same speed, a pinion journaled on each of the arms and meshing with the driven gear, and means for sliding the hub on the axle to disengage the arm from the clutch, said arm-sliding means being operable to slide the hub on the axle to move the pinions into mesh with the fixed gear while one thereof remains in mesh with the driven gear for indirectly turning the wheel from the driven axle, the teeth of the gears and the pinions being constructed and arranged to turn the wheel at a materially slower speed than that of the driven axle.

3. In a unit of the class described, a driven axle, a wheel, clutch means fixed relative to the wheel for driving the same, a fixed gear, a driven gear journaled on the axle and secured to the wheel for turning the same, said wheel and gears being in axial alignment with the axle, a pair of aligned diametrically opposite arms having a common hub secured to the axle for rotation therewith but free for axial sliding movement thereon, means for sliding the hub on the axle to move the arms into interlocking engagement with the clutch means to turn the wheel directly from the driven axle at the same speed, a wide pinion journaled on one of the arms and meshing with the driven gear, a small pinion and an advanced pinion journaled on the other arm for independent turning movements, the former being in mesh with the driven gear and the latter out of mesh therewith, said arm-sliding means being operable to slide the hub on the axle to disengage the arms from the clutch means and move the wide pinion into mesh with the fixed gear while remaining in mesh with the driven gear, for moving the small pinion out of mesh with the driven gear and into mesh with the fixed gear and for moving the advanced pinion into mesh with the driven gear for indirectly driving the wheel from the driven axle, the teeth of the gears and the pinions being constructed and arranged to turn the wheel at a materially slower speed than that of the driven axle.

4. The structure defined in claim 3 in which the clutch means is a plurality of pairs of circumferentially spaced lugs between the members of which the arms project.

5. In a unit of the class described, a driven axle, a wheel, clutch means fixed relative to the wheel for driving the same, a fixed gear, a driven gear journaled on the driven axle and secured to the wheel for turning the same, said wheel and gears being in axial alignment with the axle, said driven gear having one tooth more than the fixed gear, a radial arm on the axle held for rotation therewith but free for axial sliding movement thereon, means for sliding the arm on the axle to move the arm into interlocking engagement with the clutch means to turn the wheel directly from the driven axle at the same speed, a pinion journaled on the arm and meshing with the driven gear, said arm-sliding means being operable to slide the arm on the axle to disengage the same from the clutch means and move the pinion into mesh with the fixed gear while remaining in mesh with the driven gear for indirectly turning the wheel from the driven axle.

6. The structure defined in claim 5 in which the pitch of the teeth of the driven gear is less than that of the teeth of the fixed gear.

7. In a unit of the class described, a driven axle, a wheel, clutch means fixed relative to the wheel for driving the same, a fixed gear, a driven gear journaled on the axle and secured to the wheel for turning the same, said wheel and gears being in axial alignment with the axle, said driven gear having one tooth more than the fixed gear, a pair of aligned diametrically opposite radial arms having a common hub on the axle held for rotation therewith but free for axial sliding movement thereon, means for sliding the hub on the axle to move the arms into interlocking engagement with the clutch means to turn the wheel directly from the axle at the same speed, a wide pinion journaled on one of the arms and meshing with the driven gear, a pinion journaled on the other arm and meshing with the driven gear, said arm-sliding means being operable to slide the hub on the axle to disengage the arms from the clutch means and move the pinions into mesh with the fixed gear while the wide pinion remains in mesh with the driven gear to turn the wheel indirectly from the driven axle at a greatly reduced speed.

8. The structure defined in claim 5, further including a diametrically opposite counterbalance on the arm.

9. In a unit of the class described, a driven axle, a wheel, a fixed inner gear support through which the axle extends, an outer driven gear support journaled on the axle and secured to the wheel for turning the same, clutch means on the driven gear support, said gear supports having on their perimeters annular body members concentric with the axle, an annular fixed ring gear and an annular driven ring gear interposed between the body members and rigidly secured, the former to the body member of the fixed gear support and the latter to the driven gear support, said driven gear having one tooth more than the fixed gear, an arm on the axle held for rotation therewith but free for axial sliding movement thereon, means for sliding the arm on the axle to move the arm into interlocking engagement with the clutch means to turn the wheel directly from the driven axle at the same speed, a pinion journaled on the arm and meshing with the driven gear, said arm-sliding means being operable to slide the arm on the axle to disengage it from the clutch means and move the pinion into mesh with the fixed gear while remaining in mesh with the driven gear to indirectly turn the wheel from the driven axle at a greatly reduced speed.

10. The structure defined in claim 9, further including a diametrically opposite counterbalance on the arm.

11. The structure defined in claim 9, further including means for holding the fixed gear support against inward movement relative to the axle, and means on the axle for holding the gear supports and the ring gears in assembled relation with a working clearance between the two gears.

12. The structure defined in claim 9, further including an oil-absorbent material on the periphery of the driven gear, and a band encircling both gears, secured to the fixed gear and holding said material in place.

13. The structure defined in claim 9 in which the pitch of the teeth on the driven gear is less than that of the teeth on the fixed gear.

14. The structure defined in claim 9 in which the journal for the driven ring gear includes two axially spaced anti-friction bearings.

15. In a unit of the class described, an axle housing, a driven axle journaled in the housing and extending outwardly thereof, a traction wheel at the outer end of the axle, an inner fixed gear support having a central opening through which the axle projects, said gear support being rigidly secured to the axle housing, a driven gear support having a central opening through which the outer end portion of the axle support projects, said driven gear support being journaled on the axle and rigidly secured to the wheel, said gear supports having body members in opposing relation, a fixed ring gear and a driven ring gear interposed between the body member and rigidly secured, the former to the fixed ring gear and the latter to the driven ring gear, means holding the gear supports and the gears in assembled relation with a working fit between the gears, said driven gear support having on its inner face circumferentially spaced pairs of driving lugs, a pair of aligned diametrically opposite radial arms having a common hub on the axle held for rotation therewith but free for sliding movement thereon, means for sliding the hub on the axle to position the arms between members of certain of the driving lugs to turn the wheel directly from the axle at the same speed, a wide pinion journaled on one of the arms and meshing with the driven gear, a small pinion and an advanced pinion journaled on the other arm for independent turning movement, said advanced pinion being out of mesh with the driven gear and the small pinion being in mesh with the driven gear, said driven gear having one tooth more than the fixed gear, said arm-sliding means being operable to slide the hub on the axle to disengage the arms from the driving lugs and move the wide pinion into mesh with the fixed gears while remaining in mesh with the driven gear and for moving the small gear out of mesh with the driven gear and into mesh with the fixed gear and the advanced pinion into mesh with the driven gear to indirectly turn the wheel from the driven axle at a greatly reduced speed.

DANIEL F. PRZYBYLSKI.

REFERENCES CITED

The following references are of record in the file of this patent:

UNITED STATES PATENTS

| Number | Name | Date |
|---|---|---|
| 557,695 | Penney | Apr. 7, 1896 |
| 1,377,864 | Walter | May 10, 1921 |
| 1,464,887 | Starr | Aug. 14, 1923 |